United States Patent [19]
Kobayashi

[11] Patent Number: 5,202,958
[45] Date of Patent: Apr. 13, 1993

[54] PLOTTER WITH STORED IMAGE INFORMATION

[75] Inventor: Hisayuki Kobayashi, Ueda, Japan

[73] Assignee: Mimaki Engineering Co., Ltd., Nagano, Japan

[21] Appl. No.: 696,165

[22] Filed: May 6, 1991

[30] Foreign Application Priority Data

Jul. 31, 1990 [JP] Japan .................. 2-203154

[51] Int. Cl.$^5$ .............................. G06K 15/00
[52] U.S. Cl. ...................... 395/102; 395/103
[58] Field of Search .............. 395/101, 103, 102, 115, 395/116, 164; 400/68, 61, 76, 63, 65, 62; 346/139 R, 154

[56] References Cited

U.S. PATENT DOCUMENTS

| | | | |
|---|---|---|---|
| 4,603,396 | 7/1986 | Washizuka et al. | 395/103 |
| 4,853,877 | 8/1989 | Parkhurst et al. | 395/103 |
| 4,944,614 | 7/1990 | Tanaka | 400/68 |
| 5,020,004 | 5/1991 | Igarashi | 395/115 |

FOREIGN PATENT DOCUMENTS 0276026 7/1988 European Pat. Off. ............ 395/102

OTHER PUBLICATIONS

Patent Abstracts of Japan, The Patent Office Japanese Gov't. vol. 6, No. 255 Dec. 14, 1982.

Patent Abstracts of Japan, The Patent Office Japanese Gov't., vol. 6, No. 8, Jan 19, 1982.

European Search Report of copending EP 91 10 7346, European Patent Office, Mar. 4, 1992.

*Primary Examiner*—Arthur G. Evans
*Attorney, Agent, or Firm*—Price, Gess & Ubell

[57] ABSTRACT

A plotter system having a plotter wherein, in a state in which the fore end of a writing utensil grasped by a pen carriage is brought into contact with the surface of a sheet placed on a recording surface, the pen carriage is moved in X-Y directions relative to the sheet on this sheet in accordance with movement data items transferred from a host computer, thereby to depict figures, characters etc. on the sheet surface. The plotter system comprises a nonvolatile memory capable of storing therein movement data for a stipulated pattern to be used in depicting the stipulated pattern on the sheet surface from among the movement data items transferred from the host computer to the plotter. In depicting the figures, the characters etc. including the stipulated pattern on the sheet surface by the use of the plotter, the stipulated pattern is depicted in accordance with the movement data stored in the nonvolatile memory, and the figures, the characters etc. other than the stipulated pattern are depicted by driving the plotter in accordance with the movement data items transferred from the host computer, except the movement data for the stipulated pattern.

22 Claims, 2 Drawing Sheets

PLOTTER WITH STORED IMAGE INFORMATION

BACKGROUND OF THE INVENTION

1. Field of the Invention

The present invention relates to a plotter for automatically depicting figures, characters etc. on the surface of a sheet. More particularly, it relates to a plotter by which figures, characters etc. including stipulated patterns, such as a border and the logo of a company, are automatically depicted on the surface of a sheet.

2. Description of Related Art

There has been well known a plotter wherein, in the state in which the fore end of a writing utensil grasped by a pen carriage is touched down to the surface of a sheet placed on a recording surface, the pen carriage is moved in X-Y directions relative to the sheet in accordance with movement data transferred from a host computer, thereby to depict a figure, a character or the like on the sheet surface.

With the prior-art plotter, in depicting any of figures, characters etc., which include stipulated patterns such as borders and the logos of companies, on the sheet surface, all of the movement data items for moving the pen carriage in the X-Y directions relative to the sheet are transferred from the host computer to the plotter through a communication circuit or the like on each occasion. Thereafter, the pen carriage is relatively moved in the X-Y directions on the sheet in accordance with the corresponding movement data transferred.

In the above-stated case where all of the movement data items for driving the plotter are transferred from the host computer to the plotter on each occasion of depicting any of figures, characters etc. including stipulated patterns on the sheet surface, a too long time is expended on the transfer of the movement data items. Besides, too much labor is expended in affording all of the plotter driving movement data items from a keyboard or the like to the host computer through an input operation. Further, the start-up time of the plotter, which is required until the plotter begins to depict the figure, the character or the like on the sheet surface since an access to the host computer for transferring the plotter driving movement data items to the plotter, is too long. With the plotter, therefore, the figure, the character or the like cannot be depicted on the sheet surface promptly without much labor.

SUMMARY OF THE INVENTION

The present invention has been made in view of the problems of the prior art mentioned above.

Accordingly, the present invention has for its object to provide a plotter system which can depict a figure, a character or the like including a stipulated pattern, on the surface of a sheet easily and promptly without expending much labor and a long time.

It is also an object of the present invention to provide a plotter system in which in depicting a figure, a character or the like including a stipulated pattern, on the surface of a sheet, a time period for transferring movement data for the stipulated pattern from a host computer to the plotter proper is dispensed with, and other movement data for driving the plotter proper can be transferred from the host computer to the plotter proper early.

Further, it is an object of the present invention to provide a plotter system in which while plotter driving movement data is being transferred from a host computer to the plotter proper, the plotter proper can begin to depict a stipulated pattern on the surface of a sheet early, so that a start-up time period for driving the plotter proper is sharply shortened.

Besides, it is an object of the present invention to provide a plotter system in which movement data for a stipulated pattern need not be afforded from a keyboard or the like to a host computer through a very laborious input operation each time a figure, a character or the like including the stipulated pattern is depicted on the surface of a sheet.

Moreover, it is an object of the present invention to provide a plotter system which can depict at will a stipulated pattern in a size conforming to the size of a sheet or any of stipulated patterns in various sizes or of different sorts that are not governed by the size of the sheet.

According to the present invention, there is provided a plotter system comprising a nonvolatile memory capable of storing therein movement data for at least one stipulated pattern to be used in depicting the stipulated pattern on a surface of a sheet, among movement data items transferred from a host computer to a plotter proper, and movement means for moving a pen carriage in X-Y directions relative to the sheet on this sheet in accordance with the movement data stored in said nonvolatile memory.

In a preferred embodiment of the present invention, the plotter system comprises pick means for picking out movement data for a predetermined stipulated pattern from among movement data items for a plurality of stipulated patterns stored in the nonvolatile memory, and for actuating the movement means in accordance with the movement data picked out.

In another preferred embodiment of the present invention, the plotter system comprises discrimination means for discriminating a size of the sheet placed on the recording surface, and selection means for selecting movement data for the stipulated pattern in a size conforming to the sheet size discriminated by the discrimination means, from among movement data items for the stipulated pattern in a plurality of sizes as stored in the nonvolatile memory, and for actuating the movement means in accordance with the selected movement data.

In the plotter system of the above construction according to the present invention, when figures, characters etc. including stipulated patterns such as the line of a border and the logo of a company have been depicted on the surface of the sheet by driving the plotter proper on the basis of plotter driving movement data items transferred from the host computer, the movement data items for the stipulated patterns used for depicting these stipulated patterns on the sheet surface, among the transferred movement data items, are kept stored in the nonvolatile memory.

Alternatively, the movement data items for the stipulated patterns to be used in depicting these stipulated patterns on the surface of the sheet are transferred from the host computer to the plotter proper beforehand, and the transferred movement data items for the stipulated patterns are kept stored in the nonvolatile memory.

Thenceforth, when figures, characters etc. including stipulated patterns are to be depicted on the surface of the sheet placed on the recording surface by driving the plotter proper on the basis of plotter driving movement data items transferred from the host computer, the stipulated pattern is depicted on the surface of the sheet in such a way that the pen carriage is moved in the X-Y directions relative to the sheet by actuating the movement means on the basis of the movement data for the stipulated pattern stored in the nonvolatile memory.

In that case, the other movement data items for driving the plotter proper, except the movement data for the stipulated pattern, are transferred from the host computer, and the figures, the characters etc. other than the stipulated pattern are depicted on the sheet surface by driving the plotter proper on the basis of the transferred movement data items.

Then, when the figures, the characters etc. including the stipulated patterns are to be depicted on the sheet surface by the plotter proper, a time period for transferring the movement data for the stipulated pattern from the host computer to the plotter proper can be saved, and a time period for transferring the movement data items for driving the plotter proper from the host computer to the plotter proper can be shortened.

Simultaneously, while the plotter driving movement data items are being transferred from the host computer to the plotter proper by way of example, the depiction of the stipulated pattern such as the border or the logo of a company on the sheet surface can be started early in such a way that the plotter proper is driven with the movement means on the basis of the stipulated-pattern movement data stored in the nonvolatile memory.

Further, thenceforth, the movement data for the stipulated pattern need not be transferred from the host computer to the plotter proper, and the labor of affording the stipulated-pattern movement data to the host computer through an input operation can be saved.

Besides, in a plotter system furnished with pick means for picking out movement data for a predetermined stipulated pattern from among movement data items for a plurality of stipulated patterns stored in the nonvolatile memory and for actuating the movement means on the basis of the movement data picked out; movement data items for a plurality of stipulated patterns in different sizes or of different sorts, transferred from the host computer to the plotter proper, are kept stored in the nonvolatile memory, movement data for a stipulated pattern of predetermined size or sort is picked out by the pick means from among the movement data items for the plurality of stipulated patterns stored in the nonvolatile memory, and the movement means is actuated on the basis of the movement data picked out, whereby the stipulated pattern of predetermined size or sort, which conforms to the size of the sheet or which is not governed by the size of the sheet, can be depicted on the surface of the sheet at will by the use of the plotter system.

Besides, in a plotter system furnished with discrimination means for discriminating the size of the sheet placed on the recording surface, and selection means for selecting movement data for a stipulated pattern in a size conforming to the size of the sheet discriminated by the discrimination means, from among movement data items for the stipulated pattern in a plurality of sizes as stored in the nonvolatile memory, and for actuating the movement means on the basis of the selected movement data; movement data items for a stipulated pattern in a plurality of sizes, transferred from the host computer to the plotter proper, are kept stored in the nonvolatile memory, the size of the sheet placed on the recording surface is discriminated by the discrimination means, movement data for the stipulated pattern in a size conforming to the size discriminated by the discrimination means is selected by the selection means from among the plurality of movement data items for the stipulated pattern as stored in the nonvolatile memory, and the movement means is actuated on the basis of the selected movement data, whereby the stipulated pattern in the size conforming to the size of the sheet can be depicted on the sheet surface by the use of the plotter system without reaching a place outside the sheet.

BRIEF DESCRIPTION OF THE DRAWINGS

These and other objects and numerous effects of the present invention will become apparent by reference to the following detailed description and the accompanying drawings, in which.

DETAILED DESCRIPTION OF THE PREFERRED EMBODIMENTS:

Now, plotters embodying the present invention will be described with reference to the drawings.

Figure 1:
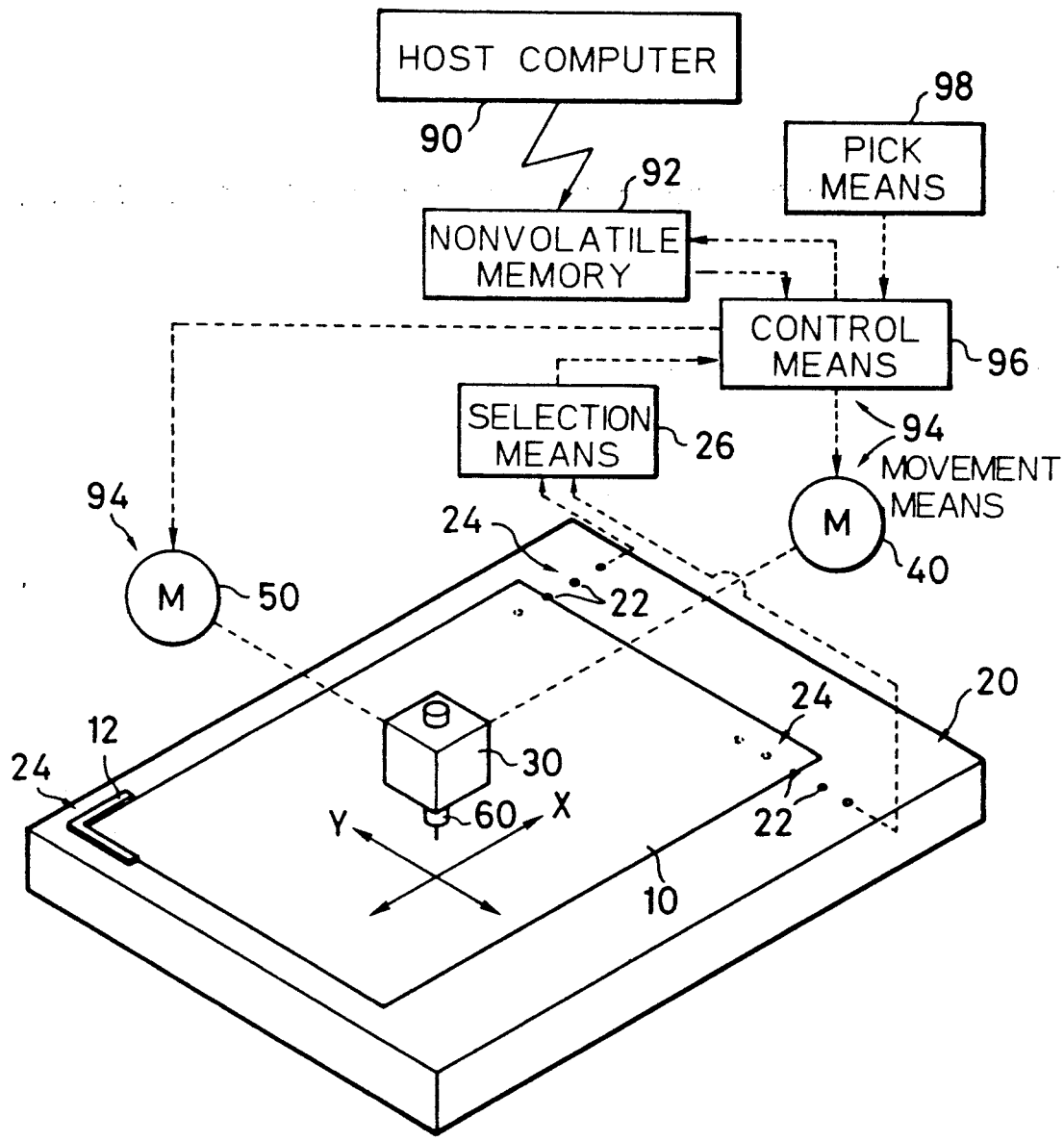
FIG. 1 is a block diagram illustrative of the schematic construction of an embodiment of a flat bed type plotter according to the present invention.

FIG. 1 shows a block diagram illustrative of the schematic construction of the preferred embodiment in the case where the present invention is applied to a plotter called the "flat bed type". The embodiment illustrated in the figure will be described below.

In the plotter in FIG. 1, a recording surface 20 on which a sheet 10 is placed is in the shape of a flat surface of a large area.

A pen carriage 30 is supported over the recording surface 20 through support means (not shown) so as to be movable in X-Y directions on the sheet 10 placed on the recording surface 20.

An X-directional driving motor 40 and a Y-directional driving motor 50, such as servomotors or stepping motors, for moving the pen carriage 30 in the X-Y directions on the sheet 10 placed on the recording surface 20 are respectively coupled to this pen carriage 30 through transmission means (not shown) for transmitting the turning forces of the driving motors 40 and 50 to the pen carriage 30.

Further, a writing utensil such as pen 60 is grasped by the pen carriage 30.

The above is the construction of the plotter called the flat bed type. This plotter is used as explained below.

The sheet 10 is placed on the flat recording surface 20, and the fore end of the writing utensil 60 grasped by the pen carriage 30 is touched down to the front surface of the sheet 10. Under this state, the X-directional driving motor 40 and Y-directional driving motor 50 are respectively driven to move the pen carriage 30 in the X-Y directions on the sheet 10, on the basis of plotter driving movement data transferred from a host computer 90. Thus, a figure, a character or the like is depicted on the surface of the sheet 10 by the writing utensil 60.

Figure 2:
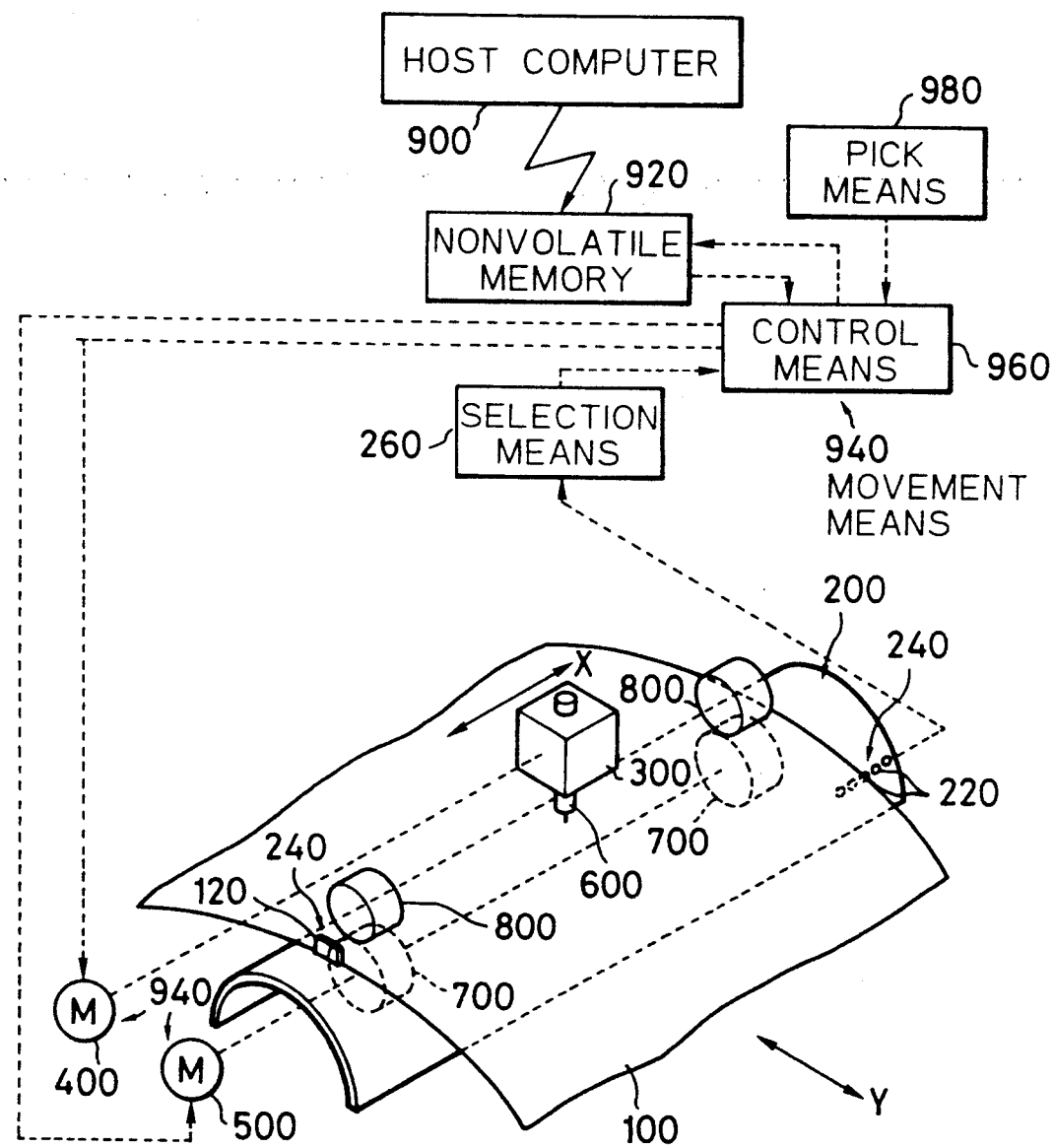
FIG. 2 is a block diagram illustrative of the schematic construction of an embodiment of a paper moving type plotter according to the present invention.

FIG. 2 shows a block diagram illustrative of the schematic construction of the preferred embodiment in the case where the present invention is applied to a plotter called the "paper moving type". The embodiment illustrated in the figure will be described below.

In the plotter in FIG. 2, a recording surface 200 on which a sheet 100 is placed has a vertical section substantially in the shape of a circular arc, and it extends laterally.

Drive rollers 700 are respectively mounted under both the sideward parts of the recording surface 200 so as to be rotatable in the widthwise direction, namely, Y direction of this recording surface, in the state in which the partial peripheral surfaces of the drive rollers 700 are exposed over the recording surface 200.

Pinch rollers 800 are respectively mounted over and opposite the drive rollers 700 at both the sideward parts of the recording surface 200 so as to be rotatable in the Y direction of this recording surface, in the state in which the partial peripheral surfaces of the pinch rollers 800 are held in contact with those of the drive rollers 700 exposed over the recording surface 200.

A driving motor, such as servomotor or stepping motor, 500 for synchronously rotating the drive rollers 700 at both the sideward parts of the recording surface 200 is coupled to these drive rollers 700 through transmission means (not shown) for transmitting the turning force of the motor 500 to the drive rollers 700.

A pen carriage 300 is supported over the recording surface 200 through support means (not shown) so as to be movable in the lengthwise direction, namely, X direction of the recording surface 200 on the sheet 100 put on this recording surface.

A driving motor, such as servomotor or stepping motor, 400 for moving the pen carriage 300 in the X direction is coupled to the pen carriage 300 through transmission means (not shown) for transmitting the driving force of the motor 400 to the pen carriage 300.

Further, a writing utensil such as pen 600 is grasped by the pen carriage 300.

The above is the construction of the plotter called the paper moving type. This plotter is used as explained below.

In the state in which the sheet 100 is placed on the rebording surface 200 and has both its side edges inserted between the partial peripheral surfaces of the drive rollers 700 exposed at both the sideward parts of the recording surface 200 and those of the pinch rollers 800 held in contact with the respectively corresponding exposed surfaces, so as to be sandwiched between the drive rollers 700 and the corresponding pinch rollers 800, the driving motor 500 is rotated on the basis of plotter driving movement data transfer-red from a host computer 900. Then, the drive rollers 700 are rotated in the Y direction, and the sheet 100 is moved in the Y direction on the recording surface 200. Simultaneously, in the state in which the fore end of the writing utensil 600 grasped by the pen carriage 300 is touched down to the front surface of the sheet 100, the driving motor 400 is rotated on the basis of plotter driving movement data transferred from the host computer 900. Then, the pen carriage 300 is moved in the X direction on the recording surface 200. Thus, a figure, a character or the like is depicted on the surface of the sheet 100 by the writing utensil 600.

In addition to the foregoing construction, each of the plotters proper of the plotter systems of the flat bed type and the moving paper type respectively shown in FIG. 1 and FIG. 2 is furnished with a nonvolatile memory 92 or 920 which can store therein stipulated-pattern movement data for use in depicting a stipulated pattern, such as a border or the logo of a company, on the surface of the sheet 10 or 100, among the plotter driving movement data items transfer-red from the host computer 90 or 900 to the plotter proper. The nonvolatile memory 92 or 920 employed is, for example, a semiconductor memory such as $E^2$—PROM or RAM backed up with a battery.

Also, each plotter proper is furnished with movement means 94 or 940 for moving the pen carriage 30 or 300 in the X-Y directions on the sheet 10 or 100 in accordance with the movement data stored in the nonvolatile memory 92 or 920. Concretely, the nonvolatile memory 92 or 920 is connected to the driving motors 40, 50 or 400, 500 for moving the pen carriage 30 or 300 and rotating the drive rollers 700, through control means 96 or 960 constructed of a semiconductor device or the like. Thus, the control means 96 or 960 and the driving motors 40, 50 or 400, 500 constitute the movement means 94 or 940.

The plotter systems of the flat bed type and the paper moving type according to the present invention respectively shown in FIG. 1 and FIG. 2 are contrived as described above.

Next, the operations of both the plotter systems will be described together with the examples of uses thereof.

In each of the plotter systems of the above constructions, when figures, characters etc. including stipulated patterns such as the line of a border and the logo of a company have been depicted on the surface of the sheet 10 or 100 by driving the plotter proper on the basis of plotter driving movement data items transferred from the host computer 90 or 900, the movement data items for the stipulated patterns used for depicting these stipulated patterns on the sheet surface, among the transferred movement data items, are kept stored in the nonvolatile memory 92 or 920.

Alternatively, the movement data items for the stipulated patterns to be used in depicting these stipulated patterns on the surface of the sheet 10 or 100 are transferred from the host computer 90 or 900 to the plotter proper beforehand, and the transfer-red movement data items are kept stored in the nonvolatile memory 92 or 920.

Thenceforth, when figures, characters etc. including stipulated patterns are to be depicted on the surface of the sheet 10 or 100 placed on the recording surface 20 or 200 by driving the plotter proper on the basis of plotter driving movement data items transferred from the host computer 90 or 900, the stipulated pattern is depicted on the surface of the sheet 10 or 100 in such a way that the pen carriage 30 or 300 is moved in the X-Y directions relative to the sheet 10 or 100 on this sheet by actuating the movement means 94 or 940 on the basis of the movement data for the stipulated pattern stored in the nonvolatile memory 92 or 920.

In that case, the plotter driving movement data items other than the stipulated-pattern movement data are transferred from the host computer 90 or 900, and the figures, the characters etc. other than the stipulated pattern are depicted on the surface of the sheet 10 or 100 by driving the plotter proper on the basis of the transferred movement data items.

Then, a time period for transferring the movement data for the stipulated pattern from the host computer 90 or 900 to the plotter proper can be saved.

Simultaneously, while the plotter driving movement data items are being transferred from the host computer 90 or 900 to the plotter proper by way of example, the depiction of the stipulated pattern such as the border or the logo of a company on the surface of the sheet 10 or 100 can be started early in such a way that the plotter proper is driven with the movement means 94 or 940 on the basis of the stipulated-pattern movement data stored in the nonvolatile memory 92 or 920.

Further, the movement data for the stipulated pattern need not be afforded from a keyboard or the like to the host computer 90 or 900 through an input operation thenceforth.

Meanwhile, in the plotter system of each of the foregoing embodiments, it is preferable to provide pick means 98 or 980. This pick means 98 or 980 functions to pick out movement data for a predetermined stipulated pattern from among movement data items for a plurality of stipulated patterns stored in the nonvolatile memory 92 or 920, and to actuate the movement means 94 or 940 on the basis of the movement data picked out. The provision of the pick means 98 or 980 realizes an operating aspect to be described below. Movement data items for a plurality of stipulated patterns in different sizes or of different sorts, transferred from the host computer 90 or 900 to the plotter proper, are kept stored in the nonvolatile memory 92 or 920. Using the pick means 98 or 980, movement data for a stipulated pattern of predetermined size or sort is picked out from among the movement data items for the plurality of stipulated patterns stored in the nonvolatile memory 92 or 920. Subsequently, the movement means 94 or 940 is actuated on the basis of the movement data picked out. Thus, the stipulated pattern of predetermined size or sort, which conforms to the size of the sheet 10 or 100 or which is not governed by the size of the sheet 10 or 100, can be depicted on the surface of the sheet 10 or 100 at will by the use of the plotter system.

In addition, in the plotter system of each of the foregoing embodiments, the recording surface 20 or 200 is furnished with discrimination means 24 or 240 for discriminating the size of the sheet 10 or 100 placed on this recording surface 20 or 200. As shown in FIG. 1 or FIG. 2 by way of example, the discrimination means 24 or 240 is configured of a guide 12 or 120 for positioning the end edge of the sheet 10 or 100, and photosensors 22 or 220 for discriminating the end edge of the sheet 10 or 100. More specifically, in the plotter system shown in FIG. 1, the L-shaped guide 12 is disposed at one corner part of the recording surface 20 in order to position the end edge of the sheet 10, and rows each consisting of the plurality of photosensors 22 are respectively formed in the X direction and the Y direction at the end part of the recording surface 20 remote from the corner part. In the plotter system shown in FIG. 2, the guide 120 for leading one side edge of the sheet 100 in the Y direction is disposed at one end part of the recording surface 200, and the plurality of photosensors 220 are arrayed in the X direction at the other end part of the recording surface 200. Besides, it is preferable to provide selection means 26 or 260. This selection means 26 or 260 functions to select movement data for a stipulated pattern in a size conforming to the size of the sheet 10 or 100 discriminated by the discrimination means 24 or 240, from among movement data items for the stipulated pattern in a plurality of sizes as stored in the nonvolatile memory 92 or 920, and to actuate the movement means 94 or 940 on the basis of the selected movement data. The provision of the selection means 26 or 260 realizes an operating aspect to be described below. Movement data items for a stipulated pattern in a plurality of sizes, transferred from the host computer 90 or 900 to the plotter proper, are kept stored in the nonvolatile memory 92 or 920. The size of the sheet 10 or 100 placed on the recording surface 20 or 200 is discriminated by the discrimination means 24 or 240. Movement data for the stipulated pattern in a size conforming to the discriminated size of the sheet 10 or 100 is selected by the selection means 26 or 260 from among the plurality of movement data items for the stipulated pattern as stored in the memory means 92 or 920. On the basis of the selected movement data, the movement means 94 or 940 is actuated to move the pen carriage 30 or 300 in the X-Y directions relative to the sheet 10 or 100 on this sheet. Thus, the stipulated pattern in the size conforming to the size of the sheet 10 or 100 can be depicted on the surface of the sheet 10 or 100 with the writing utensil 60 or 600 grasped by the carriage 30 or 300, at all times without reaching, e.g., the part of the recording surface 20 or 200 outside the sheet 10 or 100.

As described above, according to the plotter system of the present invention, when figures, characters etc. including stipulated patterns have been depicted on the surface of a sheet, movement data items for the stipulated patterns transferred from a host computer to a plotter proper are kept stored in a nonvolatile memory, or alternatively, the movement data items for the stipulated patterns are stored in the nonvolatile memory beforehand, whereby when figures, characters etc. including stipulated patterns such as the line of a border and the logo of a company are to be depicted on the surface of the sheet thenceforth, the stipulated pattern can be depicted on the surface of the sheet in such a way that a pen carriage is moved in X-Y directions relative to the sheet on this sheet by actuating movement means on the basis of the movement data for the stipulated pattern stored in the nonvolatile memory.

In addition, when figures, characters etc. including stipulated patterns are to be depicted on the surface of the sheet by the plotter proper thenceforth, a time period for transferring the movement data for the stipulated pattern from the host computer to the plotter proper can be saved, and the other movement data items for driving the plotter proper can be transferred early from the host computer to the plotter proper.

Simultaneously, while the plotter driving movement data items are being transferred from the host computer to the plotter proper by way of example, the depiction of the stipulated pattern on the sheet surface can be started early in such a way that the movement means is actuated on the basis of the stipulated-pattern movement data stored in the nonvolatile memory, and a start-up time period in the case of driving the plotter system can be sharply shortened.

Further, the movement data for the stipulated pattern need not be afforded from a keyboard or the like to the host computer through a laborious input operation each time the figure, the character or the like including the stipulated pattern is to be depicted on the sheet surface by the use of the plotter system.

According to the plotter system of the present invention, therefore, figures, characters etc. including stipulated patterns can be depicted on the sheet surface promptly without expending much labor and a long start-up time period.

Besides, in a plotter system furnished with pick means for picking out movement data for a predetermined stipulated pattern from among movement data items for a plurality of stipulated patterns as stored in the nonvolatile memory and for actuating the movement means on the basis of the movement data picked out; movement data items for a plurality of stipulated pattern of predetermined sizes or of different sorts are kept stored in the nonvolatile memory, a stipulated pattern of predetermined size or sort is picked out by the pick means from among the movement data items for the plurality of stipulated patterns as stored in the nonvolatile memory, and the movement means is actuated on the basis of the movement data for the stipulated pattern picked out, whereby the stipulated pattern in the size conforming to the size of the sheet or any of the stipulated patterns in various sizes or of different sorts not governed by the size of the sheet can be depicted on the surface of the sheet at will by the use of the plotter system.

Besides, in a plotter system furnished with discrimination means for discriminating the size of the sheet placed on the recording surface, and selection means for selecting movement data for a stipulated pattern in a size conforming to the size of the sheet discriminated by the discrimination means, from among movement data items for the stipulated pattern in a plurality of sizes as stored in the nonvolatile memory, and for actuating the movement means on the basis of the selected movement data; movement data items for a stipulated pattern in a plurality of sizes are kept stored in the nonvolatile memory, the size of the sheet placed on the recording surface is discriminated by the discrimination means, movement data for the stipulated pattern in a size conforming to the size discriminated by the discrimination means is selected by the selection means from among the plurality of movement data items for the stipulated pattern as stored in the nonvolatile memory, and the movement means is actuated on the basis of the selected movement data, whereby the stipulated pattern in the size conforming to the size of the sheet can be depicted on the sheet surface at all time without reaching a place outside the sheet.

The preferred embodiments described in this specification and illustrated in the drawings are exemplary and are not restrictive, and various other modifications are, of course, possible. The scope of the invention is defined by the appended claims, and all modifications falling within the significances of those claims shall be covered within the present invention.

What is claimed is:

1. In a plotter wherein, a writing utensil grasped by a pen carriage is brought into contact with a surface of a sheet placed on a recording surface, the pen carriage is moved in X-Y directions relative to the sheet in accordance with movement date items transferred from a host computer, to thereby depict figures, characters etc. on the sheet surface, the improvement comprising:
   a nonvolatile memory capable of storing therein movement data for at least one stipulated pattern to be used in depicting the stipulated pattern on the sheet surface from among the movement data items capable of being transferred from said host computer to said plotter;
   movement means for moving said pen carriage in the X-Y directions relative to the sheet in accordance with the movement data stored in said nonvolatile memory, wherein the movement data for each stipulated pattern stored in said nonvolatile memory includes movement data items for the stipulated pattern in a plurality of sizes;
   discrimination means for discriminating a size of a sheet placed on said recording surface; and
   selection means for selecting the movement data for the stipulated pattern in a size conforming to the sheet size discriminated by said discrimination means from among the movement data items for the stipulated pattern stored in said nonvolatile memory and for actuating said movement means in accordance with the selected movement data.

2. A plotter system as defined in claim 1, further comprising pick means for picking out movement data for a predetermine stipulated pattern from among movement data items for a plurality of stipulated patterns stored in said nonvolatile memory, and for actuating said movement means in accordance with the movement data picked out.

3. A plotter system as defined in claim 1, wherein said movement means includes driving motor means for moving said pen carriage and/or the sheet, and control means for connecting said driving motor means with said nonvolatile memory.

4. A plotter system as defined in claim 1, wherein said discrimination means includes a guide for positioning one end edge of the sheet, and sensors for discriminating the other end edge of the sheet.

5. A plotter system as defined in claim 1, wherein said plotter is a flat bed type plotter.

6. A plotter system as defined in claim 1, wherein said plotter is a flat bed type plotter.

7. A plotter system as defined in claim 1, wherein said plotter is a paper moving type plotter.

8. A plotter system as defined in claim 1, wherein the movement data for each stipulated pattern stored in said nonvolatile memory is stipulated-pattern movement data from among plotter driving movement data items transferred from said host computer to said plotter when figures, characters etc. including stipulated patterns have been depicted on the sheet surface by driving said plotter.

9. A plotter system as defined in claim 1, wherein the movement data for each stipulated pattern stored in said nonvolatile memory is stipulated-pattern movement data which is to be used in depicting the stipulated pattern, and which has been transferred from said host computer and stored in said nonvolatile memory beforehand.

10. A plotter system as defined in claim 1, wherein the movement data for each stipulated pattern stored in said nonvolatile memory is stipulated-pattern movement data which is to be used in depicting the stipulated pattern, and which has been transferred from said host computer and stored in said nonvolatile memory beforehand.

11. In a plotter system having a host computer and a plotter, the plotter having a recording surface which is formed to be flat, a pen carriage by which a writing utensil is grasped, a first driving motor which moves the pen carriage in an X direction, and a second driving motor which moves the pen carriage in a Y direction, wherein a fore end of the writing utensil grasped by the pen carriage is brought into contact with a surface of a sheet placed on the recording surface, the pen carriage is moved in the X-Y directions on the sheet by actuating the driving motors in accordance with movement data items transferred from the host computer, to thereby depict figures, characters etc. on the sheet surface, the improvement comprising:
   a nonvolatile memory capable of storing therein movement data for at least one stipulated pattern to be used in depicting the stipulated pattern on the sheet surface from among the movement data items capable of being transferred from said host computer to said plotter;

control means for actuating said driving motors in accordance with the movement data stored in said nonvolatile memory;

discrimination means for discriminating a size of a sheet placed on said recording surface; and selection means for selecting movement data for the stipulated pattern in a size conforming to the sheet size discriminated by said discrimination means from among movement data items for the stipulated pattern stored in said nonvolatile memory and for actuating said driving motors through said control means in accordance with the selected movement data.

12. A plotter system as defined in claim 11, further comprising pick means for picking out movement data for a predetermined stipulated pattern from among movement data items for a plurality of stipulated patterns stored in said nonvolatile memory, and for actuating said driving motors through said control means in accordance with the movement data picked out.

13. A plotter system as defined in claim 12, wherein said discrimination means includes an L-shaped guide which serves to position one end edge of the sheet and which is disposed at one corner part of said recording surface, and a plurality of photosensors which serve to discriminate a position of the other end edge of the sheet and which are arrayed in the X direction and Y direction at an end part of said recording surface remote from said guide.

14. In a plotter system having a host computer and a plotter, the plotter having a recording surface which is formed to have a circular arc section and to extend laterally, a pen carriage by which a writing utensil is grasped, a drive roller and a pinch roller set held in pressed and rotatable contact with each other respectively mounted on each sideways part of said recording surface, a first driving motor which moves the pen carriage in an X direction, and a second driving motor which rotates the drive rollers, wherein a fore end of the writing utensil grasped by the pen carriage is brought into contact with a surface of a sheet placed on the recording surface, the pen carriage is moved in the X-Y directions relative to the sheet by actuating the driving motors in accordance with movement data items transferred from the host computer, thereby to depict figures, characters etc. on the sheet surface, the improvement comprising:

a nonvolatile memory capable of storing therein movement data for at least one stipulated pattern to be used in depicting the stipulated pattern on the sheet surface from among the movement data items transferred from said host computer to said plotter;

control means for actuating said driving motors in accordance with the movement data stored in said nonvolatile memory;

discrimination means for discriminating a size of a sheet placed on said recording surface; and selection means for selecting movement data for the stipulated pattern in a size conforming to the sheet size discriminated by said discrimination means, from among the movement data items for the stipulated pattern stored in said nonvolatile memory and for actuating said driving motors through said control means in accordance with the selected movement data.

15. A plotter system as defined in claim 14, further comprising pick means for picking out movement data for a predetermined stipulated pattern from among movement data items for a plurality of stipulated patterns stored in said nonvolatile memory, and for actuating said driving motors through said control means in accordance with the movement data picked out.

16. A plotter system as defined in claim 15, wherein said discrimination means includes a guide which serves to lead one end edge of the sheet in the Y direction and which is disposed at one end part of said recording surface, and a plurality of photosensors which serve to discriminate a position of the other end edge of the sheet and which are arrayed in the X direction at the other end part of said recording surface opposite to said guide.

17. A plotter system as defined in claim 2, wherein said movement means includes driving motor means for moving said pen carriage and/or the sheet, and control means for connecting said driving motor means with said nonvolatile memory.

18. A plotter system as defined in claim 2, wherein said plotter is a flat bed type plotter.

19. A plotter system as defined in claim 2, wherein said plotter is a paper moving type plotter.

20. A plotter system as defined in claim 2, wherein the movement data for each stipulated pattern stored in said nonvolatile memory is stipulated-pattern movement data from among plotter driving movement data items transferred from said host computer to said plotter when figures, characters, etc., including stipulated patterns, have been depicted on the sheet surface by driving said plotter.

21. A plotter system as define in claim 2, wherein the movement data for each stipulated pattern stored in said nonvolatile memory is stipulated-pattern movement data which is to be used in depicting the stipulated pattern, and which has been transferred from said host computer and stored in said nonvolatile memory beforehand.

22. An improved plotter system capable of being driven by data from a host computer comprising:

a recording surface;

means for contacting the recording surface to impart indicia on the recording surface;

means for driving the contacting means relative to a sheet placed on the recording surface;

means for measuring the size of sheet placed on the recording surface and providing a signal indicative of the size;

memory means for storing predetermined data to drive the driving means independent of data from the host computer, and means for addressing the stored data in the memory means, in response to the signal, to enable the driving of the driving means.

* * * * *